(12) United States Patent
Mohammed et al.

(10) Patent No.: US 12,388,789 B2
(45) Date of Patent: Aug. 12, 2025

(54) SECURITY SOLUTION ORCHESTRATION

(71) Applicant: Cisco Technology, Inc., San Jose, CA (US)

(72) Inventors: Faizan Amjad Mohammed, Fremont, CA (US); Venkatesh Nataraj, Union City, CA (US); Gowri Mahendran Lingam Chandramohan, Santa Clara, CA (US); Saravanan Radhakrishnan, Karnataka (IN); Kannan Kumar, Tracy, CA (US)

(73) Assignee: Cisco Technology, Inc., CA (US)

( * ) Notice: Subject to any disclaimer, the term of this patent is extended or adjusted under 35 U.S.C. 154(b) by 212 days.

(21) Appl. No.: 18/357,934

(22) Filed: Jul. 24, 2023

(65) Prior Publication Data
US 2025/0039141 A1    Jan. 30, 2025

(51) Int. Cl.
*H04L 9/40*    (2022.01)
(52) U.S. Cl.
CPC .......... *H04L 63/0263* (2013.01); *H04L 63/20* (2013.01)
(58) Field of Classification Search
CPC .............................. H04L 63/0263; H04L 63/20
See application file for complete search history.

(56) References Cited

U.S. PATENT DOCUMENTS

| | | | |
|---|---|---|---|
| 9,413,724 B2* | 8/2016 | Xu | H04L 67/10 |
| 10,122,737 B1* | 11/2018 | McCorkendale | H04L 63/1416 |
| 11,012,299 B2* | 5/2021 | Janakiraman | H04L 45/44 |
| 2014/0075048 A1* | 3/2014 | Yuksel | H04L 67/563 709/242 |
| 2021/0004333 A1* | 1/2021 | Jain | H04L 63/0281 |
| 2022/0070279 A1 | 3/2022 | Pang et al. | |
| 2022/0078209 A1 | 3/2022 | V et al. | |
| 2022/0103597 A1 | 3/2022 | Gobena et al. | |
| 2022/0166755 A1 | 5/2022 | Moore et al. | |
| 2022/0247788 A1 | 8/2022 | Subbanna et al. | |
| 2023/0025586 A1 | 1/2023 | Rolando et al. | |

OTHER PUBLICATIONS

Islam, Mohammed Nurul, Ricardo Colomo-Palacios, and Sabarathinam Chockalingam. "Secure access service edge: A multivocal literature review." 2021 21st International Conference on Computational Science and Its Applications (ICCSA). IEEE. (Year: 2021).*

(Continued)

*Primary Examiner* — John M Macilwinen
(74) *Attorney, Agent, or Firm* — Lee & Hayes, P.C.

(57) ABSTRACT

This disclosure describes techniques for orchestrating implementation of a security solution among network devices. The techniques include determining capabilities of routers of the network and capabilities of a cloud security service to perform security features of a security solution. Based at least in part on the capabilities, the techniques include configuring a router of the network to execute a first subset of the security features on data traffic of the network, and configuring the cloud security service to execute a second subset of the security features on the data traffic. The techniques may also include causing the security solution to be presented to a security administrator via a display, the display providing representations of the first subset and the second subset of the security features.

20 Claims, 11 Drawing Sheets

(56) References Cited

OTHER PUBLICATIONS

Pisharody, Sandeep, et al. "Brew: A security policy analysis framework for distributed SDN-based cloud environments." IEEE transactions on dependable and secure computing 16.6. (Year: 2017).*

Chewe, Mutale. "Hybrid Cloud Infrastructure Security." Metropolia University of Applied Sciences. (Year: 2021).*

Oladosu, Sunday Adeola, et al. "Advancing cloud networking security models: Conceptualizing a unified framework for hybrid cloud and on-premises integrations." Magna Scientia Advanced Research and Reviews. (Year: 2021).*

Orans, L., J. Skorupa, and N. MacDonald. "The future of network security is in the cloud." Gartner. (Year: 2019).*

\* cited by examiner

SECURITY SOLUTION ORCHESTRATION

TECHNICAL FIELD

The present disclosure relates generally to orchestrating implementation of security policy across computing devices of a network, thereby improving performance of the network.

BACKGROUND

Network environments are growing in complexity and scale to handle the ever-increasing demands on computer systems in the modern world. Additionally, cloud computing provides users with access to computing resources to fulfill users' computing resource needs. In some examples, service providers can manage and provide cloud computing resources to users to fulfill their needs without the users having to invest in and maintain their own computing infrastructure. Cloud computing often involves the use of networks of data centers which house servers, routers, and other devices that provide computing resources to users such as compute resources, networking resources, storage resources, database resources, application resources, and so forth. Managing network security across network components within an organization, while also integrating with work flow performed by external cloud computing resources, can be lead to administrative challenges in terms of efficiency of resource use, data management, and network security.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. In some cases, parentheticals are utilized after a reference number to distinguish like elements. Use of the reference number without the associated parenthetical is generic to the element. The systems depicted in the accompanying figures are not to scale and components within the figures may be depicted not to scale with each other.

DESCRIPTION OF EXAMPLE EMBODIMENTS

Overview

Figure 1A:
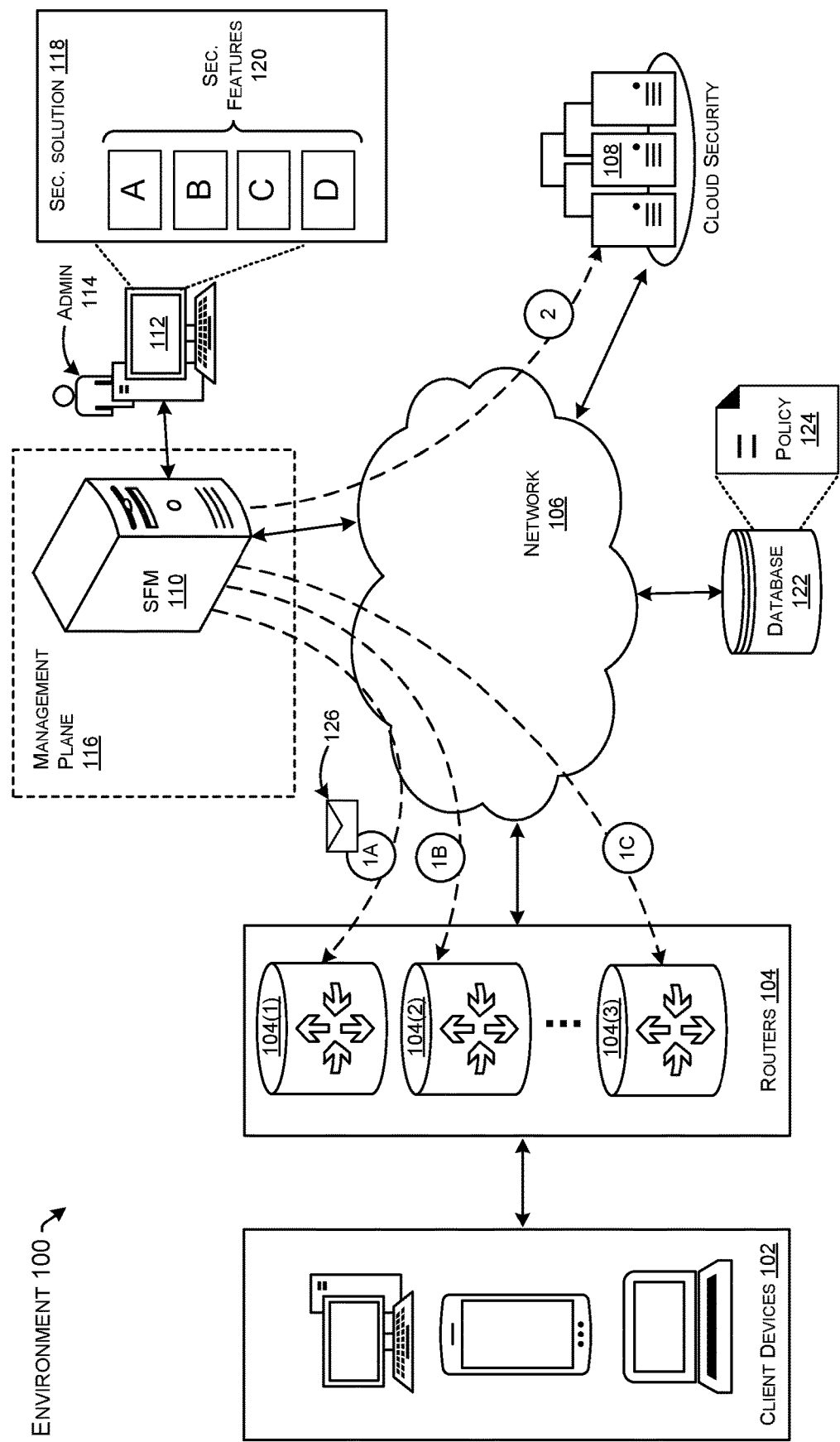
FIGS. 1A-1E illustrate component diagrams with example environment in which techniques related to orchestrating a security solution may be employed as part of communications between network devices, in accordance with the present concepts.

This disclosure describes, at least in part, a method that may be implemented by a server device communicatively coupled to network devices (e.g., a router) and cloud services (e.g., a cloud security service). The method may include obtaining a security solution for a network. In some examples, the security solution comprising multiple security features. The method may include determining first capabilities of a router of the network to perform the security features of the security solution. The method may also include determining second capabilities of a cloud security service to perform the security features of the security solution. Based at least in part on the first capabilities and the second capabilities, the method may include configuring the router of the network to execute a first subset of the security features on data traffic of the network and configuring the cloud security service to execute a second subset of the security features on the data traffic. The method may further include causing the security solution to be presented to a security administrator via a display. In some examples, the display may provide representations of the first subset and the second subset of the security features.

This disclosure also describes, at least in part, another method that may be implemented by a server device communicatively coupled to network devices (e.g., a router) and cloud services (e.g., a cloud security service). The method may include obtaining a security solution for a network. In some examples, the security solution comprising multiple security features. The method may include requesting capability information from routers of the network. The capability information may be related to the routers supporting the security features of the security solution, for instance. The method may also include receiving the capability information from the routers of the network. Based at least in part on the capability information, the method may include distributing the security solution such that a subset of the security features of the security solution is performed by an individual router and a balance of the security features of the security solution is performed by a cloud security service.

Additionally, the techniques described herein may be performed by a system and/or device having non-transitory computer-readable media storing computer-executable instructions that, when executed by one or more processors, performs the method described above.

Example Embodiments

This disclosure describes techniques for orchestrating implementation of a network security solution across computing devices of a network. An overall security solution for an organization may include multiple separate security features or components. The multiple security features may reside on or be applied at different devices in the network. Efficient orchestration of a security solution may include security feature discovery to determine which components of the network are capable of implementing the different security features. Discovery of the device capabilities may then be used to efficiently distribute the multiple security features of the overall security solution among the network devices, for more efficient use of computing resources. Furthermore, a management interface or portal may then be provided for the overall security solution, providing improved user experience in implementation of a security policy.

Generally, a computing network may consist of physical devices of an organization and also cloud devices and/or services. An example use case for orchestrating implementation of a security solution across computing devices of a network may include distribution of a security policy across software-defined wide area network (SDWAN) SDWAN computing devices (e.g., network edges) and a cloud provider security stack. Service discovery in the system of physical devices of the organization may help inform the implementation of an overall security solution. For instance, one security feature may be a firewall, which may be applied at a particular device (e.g., router) in the network. However, a more holistic and/or efficient solution would also be informed by service discovery relative to the cloud devices. For instance, another security feature may include threat inspection, which may be applied relative to multiple devices, including components of a cloud security provider.

Unfortunately, needing to understand the service capabilities in both the relatively local devices and also the cloud computing devices requires security expertise in both environments, which may currently be accessed via different management portals. For instance, a current migration path for secure access service edge (SASE) in software-defined wide area network (SDWAN) deployment may require a security administrator to handle security policies through two different portals: an SDWAN management plane and also a cloud security provider portal. This may produce a pain point for the administrator, as this can cause inconsistency in the security policy enforcement across the network. In some cases, a user may have to manually configure one or more security policies separately on different portals. Such practice can lead to user error and/or duplication of policies (e.g., enforcing the same policy(ies) or security features on an edge device as well as at the cloud portal). Furthermore, this practice may also require a user to be familiar with multiple different cloud provider portals.

Ultimately, lack of orchestration for an overall security solution may produce inconsistency in a security stack across the network. With more customers migrating towards SASE, this problematic scenario may become more common. Coordinated service discovery on routers in the network and cloud discovery may be used to distribute service usage across the network devices and the cloud. The example use case may include providing a single management interface/portal to define and manage the security policy. Thus, security solution orchestration may provide improved utilization of the network resources, while also improving ease-of-use for customers.

To summarize, a more efficient technique for security solution orchestration across a complex network is provided. The disclosed techniques improve network security with more efficient resource utilization by smartly distributing the security stack. A network security administrator may be provided a simplified portal, possibly even a single pane view for implementing a security stack for the network. The disclosed techniques can help avoid security policy duplication and/or inconsistent security policies or practices. In some implementations, the disclosed techniques may provide an easier SASE migration path for customers.

Although the examples described herein may refer to a router, an edge device, and/or a cloud computing device, the techniques can generally be applied to any device in a network. Further, the techniques are generally applicable for any network of devices managed by any entity where virtual resources are provisioned. In some instances, the techniques may be performed by software-defined networking (SDN), and in other examples, various devices may be used in a system to perform the techniques described herein. The devices by which the techniques are performed herein are a matter of implementation, and the techniques described are not limited to any specific architecture or implementation.

The techniques described herein may provide various improvements and efficiencies with respect to network communications. For instance, the techniques described herein may reduce the amount of computational resource use, storage, dropped data, latency, and other issues experienced in networks due to lack of network resources, overuse of network resources, issues with timing of network communications, and/or improper routing of data. By improving network communications across a network, overall performance by servers and virtual resources may be improved.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIGS. 1A-1E collectively illustrate an example environment 100 in accordance with the present security solution orchestration concepts. Example environment 100 may include client devices 102, routers 104, a network 106 (e.g., computing network, cloud computing network), a cloud security service 108, and/or a security feature manager 110. In some cases, parentheticals are utilized after a reference number to distinguish like elements. Use of the reference number without the associated parenthetical is generic to the element. For instance, three routers 104 are depicted, including router 104(1), router 104(2), and router 104(3). As used herein, "network 106" may be viewed as one or more networks which may include any of the devices of environment 100. The scenario depicted in FIGS. 1A-1E may be viewed as applying security solution orchestration concepts toward the implementation of a security policy over the network.

A wide variety of implementations are contemplated for security feature manager 110. For example, security feature manager 110 may be manifest as one device or multiple devices. Security feature manager 110 may be on-premise at an organization or available as a cloud service. In the example shown in FIGS. 1A-IE, security feature manager 110 may be viewed as a SDWAN controller. For instance, security feature manager 110 may be located on a server device, and may be accessible via a display 112 by an administrator 114. The administrator 114 may be able to interact with, use, and/or direct security feature manager 110 to communicate with the network via a management plane 116 (e.g., SDWAN management plane). The administrator 114 may work with security feature manager 110 to implement a security solution 118 for the network, for example. The security solution 118 may include one or more security features 120, depicted as "A," "B," "C," and "D." In some examples, representations of the security solution 118 and/or one or more of the security features 120 may be visible on the display 112, as suggested in FIGS. 1A-IE. Environment 100 may also include a database 122, which may contain a policy 124.

Security feature manager 110 may be communicatively coupled to various other devices, such as routers 104 and/or cloud security service 108, via the network 106. Within the example environment 100, the security feature manager 110, routers 104, client devices 102, cloud security service 108, database 122, and/or other devices may exchange communications (e.g., packets) via a network connection(s) to cloud computing network 106 and/or each other, generally indicated by double arrows. For instance, network connections may be transport control protocol (TCP) network connections or any network connection (e.g., information-centric networking (ICN)) that enables security feature manager 110 to exchange packets with other devices via computing network 106. The network connections represent, for example, data paths between security feature manager 110 and other devices. It should be appreciated that the term "network connection" may also be referred to as a "network path." The suggestion of a cloud computing network in this example is not meant to be limiting. Other types of networks are contemplated in accordance with security solution orchestration concepts.

FIGS. 1A-1E show several examples of communications between security feature manager 110 and various other devices of the network. The communications are indicated with dashed, numbered lines. The communications may be viewed as illustrating an example security solution orchestration scenario. For example, security feature manager 110 may be using security solution orchestration concepts to implement the overall security solution 118 for the network 106.

Referring to FIG. 1A, at "Step 1A," security feature manager 110 may send a request 126 (e.g., inquiry) to router 104(1). The request 126 may be a request for information from router 104(1). For example, security feature manager 110 may be interested in discovering the capabilities of router 104(1) with respect to the security solution 118. More specifically, security feature manager 110 may be interested in discovering whether router 104(1) is capable of performing any of security features 120. In some examples, the request 126 may be an application programming interface (API) call (e.g., communication channel) sent by the security feature manager 110 from the management plane 116. The API call may be sent within an encrypted control plane, for instance.

Steps 1B and 1C may be similar to Step 1A, in that security feature manager 110 may send requests for information to routers 104(2) and 104(3), for instance. In some examples, an SDWAN deployment may include different kinds of routers with different capabilities and/or resources. Any given security feature 120 may require particular types or amounts of computing resources, such as a type of central processing unit (CPU) and/or an amount of available memory, etc. Therefore, security feature manager 110 may wish to discover the particular capabilities of any individual routers 104 in the network.

At "Step 2," in some cases, security feature manager 110 may also send a request to cloud security service 108. The request to cloud security service 108 may also be accomplished via an API call from the SDWAN management plane 116.

Figure 1B:
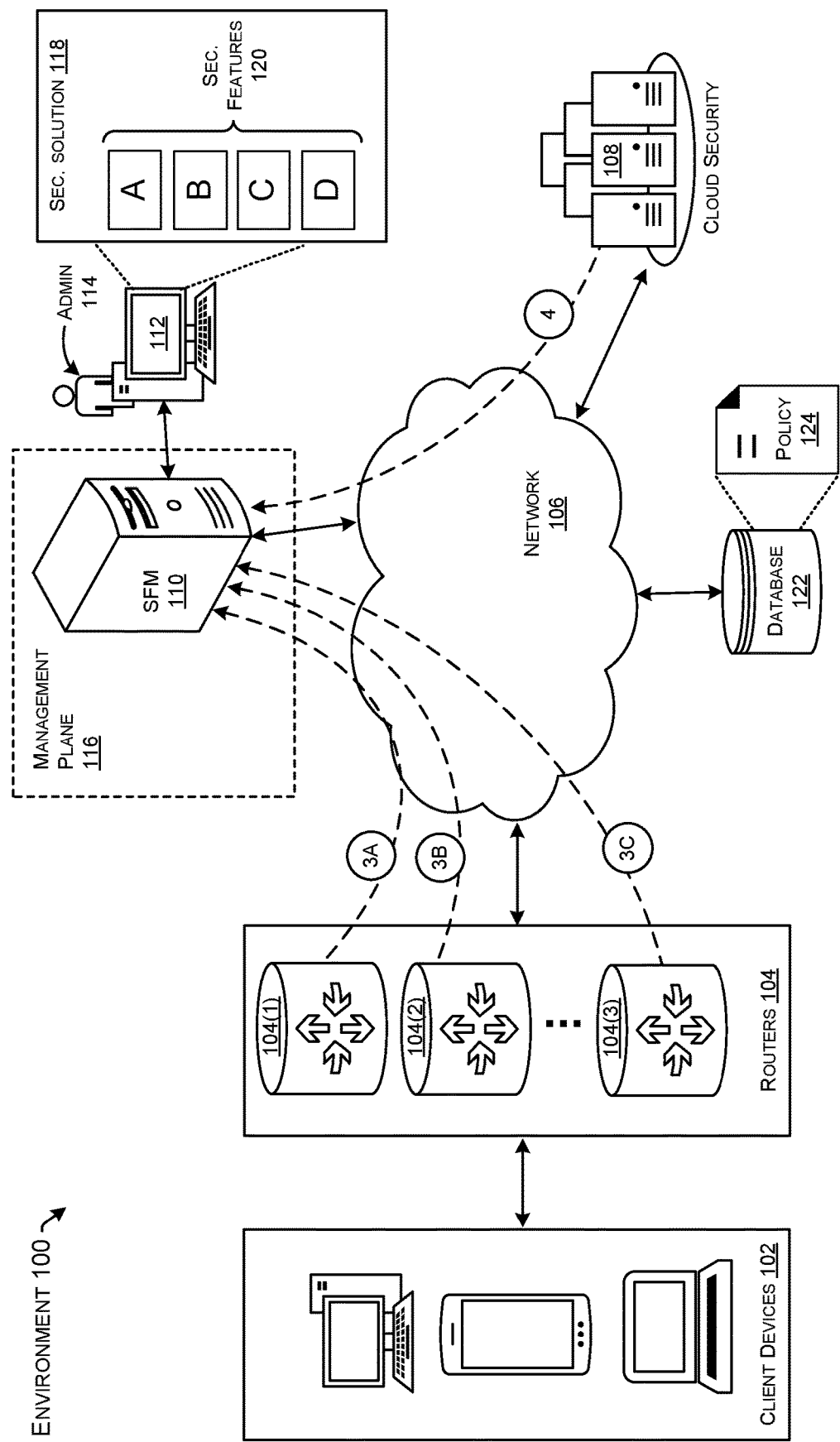
Figure 1C:
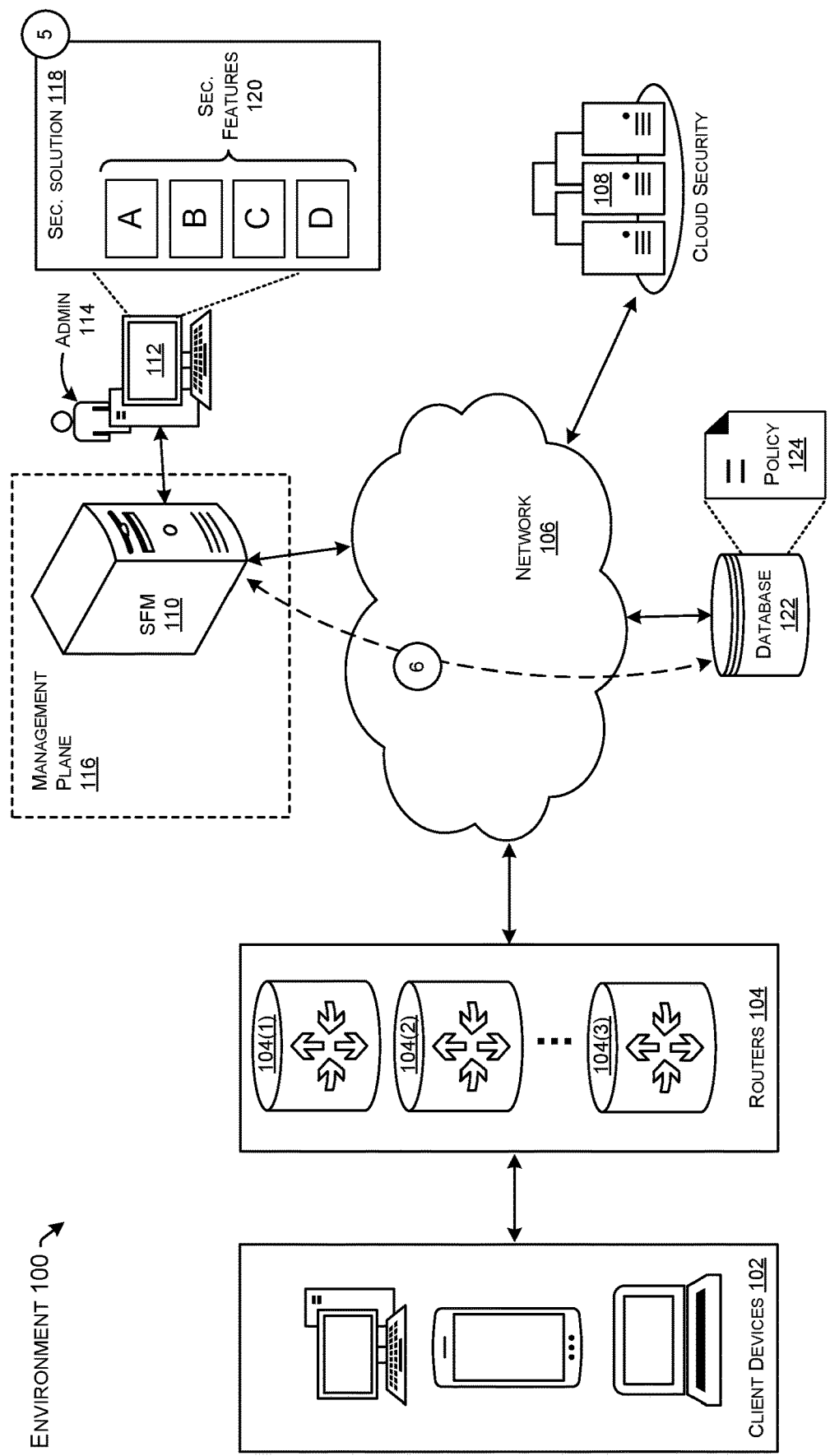

Referring to FIG. 1B, in some examples, Steps "3A," "3B," "3C," and/or "4" may represent responses to the requests for information that were sent out by security feature manager 110. For instance, at Step 3A, router 104(1) may send information to security feature manager 110 regarding capabilities for performing one or more security features 120 of the security solution 118. Further, Step 4 may represent cloud security service 108 sending information to security feature manager 110 regarding capabilities for performing one or more security features 120 of the security solution 118. The responses in Steps 3A, 3B, 3C, and/or 4 may be manifest as a list of security features 120 that each respective device/service supports, for instance. The information regarding the supported security features may be sent to the SDWAN management plane 116 via API calls. Therefore, security feature manager 110 may learn supported security features from various devices in the network, such as routers 104 and cloud security service 108.

In some example SDWAN solutions, two modes may be utilized for end host security deployments, including on-box integrated security (e.g., capabilities on a router) and cloud-delivered security, provided by a cloud security service. The on-box security solution may have basic features, such as firewall and/or domain name service (DNS) redirection. The on-box security solution may also have advanced security features, such as web filtering, threat inspection, file inspection, etc. The capability of an on-premise router to process one or more advanced security features may depend on resource availability at the router. Resource availability at the router may in turn depend on various qualities of the router itself, such as remote access memory (RAM), hard disk space, number of cores, etc. Additionally, some security features of an overall security solution may be performed by a cloud security providers, like Umbrella, zScaler, Netskope, etc. Therefore, when considering implementation of an overall security solution, knowledge of the capabilities of any routers in the network as well as knowledge of the capabilities of a cloud service provider may be helpful. As shown in the example in FIG. 1B, security solution orchestration concepts may allow this knowledge to be collected and presented to an administrator in one place, rather than the administrator having to log in to different portals to manage aspects of a security policy at different locations/devices, such as at routers vs. at a cloud service provider.

Referring to FIG. 1A, at "Step 5," in some cases, security feature manager 110 may use the information gathered through Steps 1A-4 to effect the security solution 118 on the network 106. For example, security feature manager 110 may use the information received in Steps 3A, 3B, 3C, and/or 4 to intelligently distribute the security stack between the routers 104 and/or cloud security service 108. The distribution of a security solution 118 may include determination of which device/service of a network may be configured to run any given security feature 120 of the security solution 118, based on the discovered capabilities of the device/service. A determination may include deciding that a device has the capability to perform a particular security feature 120, or may include deciding that a device does not have the capability to perform a particular security feature 120, for instance. Example instances of distribution of security solution 118 will now be provided with reference to FIG. 1C.

In one example instance of distribution of security solution 118, a customer may desire four security features 120, which may include a Firewall (A), DNS Security (B), Unified Threat Defense (C) and a secure sockets layer (SSL) Proxy (D). In this example, in Step 3A, security feature manager 110 may have discovered that router 104(1) has capability to run only the security features 120 A and B, the firewall and DNS security. Router 104(1) may not have enough computing resource to run other security features 120, such as C (the Unified Threat Defense) or D (the SSL Proxy). Stated another way, security feature manager 110 may have discovered that router 104(1) has capability to run a subset of the security features 120. Additionally, security feature manager 110 may have discovered via Step 4 that cloud security service 108 supports security features 120B, C, and D. Stated another way, cloud security service 108 supports a different subset of the security features 120 than the subset supported by router 104(1). Therefore, in this example instance, at Step 5, security feature manager 110 may determine that security features 120 A and B (e.g., a first subset) are to be run on router 104(1), while security features 120 C and D (e.g., a second subset) will be provided by the cloud security service 108.

Continuing with the example instance a distribution of security solution 118, security feature manager 110 may have discovered that router 104(2) supports security features A and C. Therefore, at Step 5, security feature manager 110 may determine that security features 120 A and C are to be run on router 104(2), while security features 120 B and D will be provided by the cloud security service 108 for traffic that travels through router 104(2). Furthermore, security feature manager 110 may have discovered that router 104(3) supports security features A, C, and D. Therefore, at Step 5, security feature manager 110 may determine that security features 120 A, C, and D are to be run on router 104(3), while security feature 120 B will be provided by the cloud security service 108 for traffic that travels through router 104(3).

The example instances of distribution of security solution 118 provided here are not meant to be limiting. Note that in a different example instance, security feature manager 110 may discover the same capabilities among the routers 104 and cloud security service 108 as described above, but may instead determine that routers 104(1) and 104(2) will only run the security feature 120 A, the Firewall, while cloud security service 108 handles the remaining security features 120-B, C, and D. Such a determination would be in keeping with the discovered capabilities of the devices, as described above. In some examples, different distributions may be driven by additional information, known or discovered, about the network or about a security policy.

In some examples, the process of security feature manager 110 using the information gathered through Steps 1A-4 to effect the security solution 118 on the network 106 may be coordinated at least in part by security administrator 114 via display 112. For instance, security feature manager 110 may present at least some of the information gathered through Steps 1A-4 on display 112. The information may be presented in a single view/pane, in some examples. The presentation may include representations of one or more of the security features 120, for instance. In some implementations, the presentation may allow the security administrator 114 to select certain security features 120 and/or devices. For instance, the security administrator 114 may be able to make a selection indicating that router 104(1) should be configured to run security features 120 A and B, while security features 120 C and D will be provided by the cloud security service 108 for traffic passing through router 104(1). The selection may be made relative to a selectable representation of one or more security features, for instance. As such, the security feature manager 110 may enable the security administrator 114 to make inputs regarding the distribution of overall security solution 118 without the security administrator 114 having to log in to different portals, such as an SDWAN management plane (e.g., for the routers) and also a separate portal for the cloud security service.

At "Step 6," in some cases, security feature manager 110 and/or security administrator 114 may seek additional information regarding an overall security solution 118 for the network. For example, security feature manager 110 may access a database 122 for a security policy 124 related to the network 106 and/or related to the security solution 118. Additional information, such as information included in a policy 124, may affect a distribution determination for security features 120. For instance, security policy 124 may inform security feature manager 110 and/or security administrator 114 of the which security features 120 are desired by a customer. In another instance, the security policy 124 may inform security feature manager 110 and/or security administrator 114 of more specific requests, such as a request for a particular security feature 120 to be performed at a particular location, etc. Note that the order of the Steps shown in FIGS. 1A-1E is not meant to be limiting. In some examples, Step 6 may be performed before the other example Steps, and/or may represent security feature manager 110 obtaining security solution 118, for instance. Also, in some examples, Step 6 may be viewed as security feature manager 110 receiving new or additional information, which may come from any network device. For instance, security feature manager 110 may receive an updated security policy. In response, security feature manager 110 may adjust a distribution of an overall security solution 118.

Figure 1D:
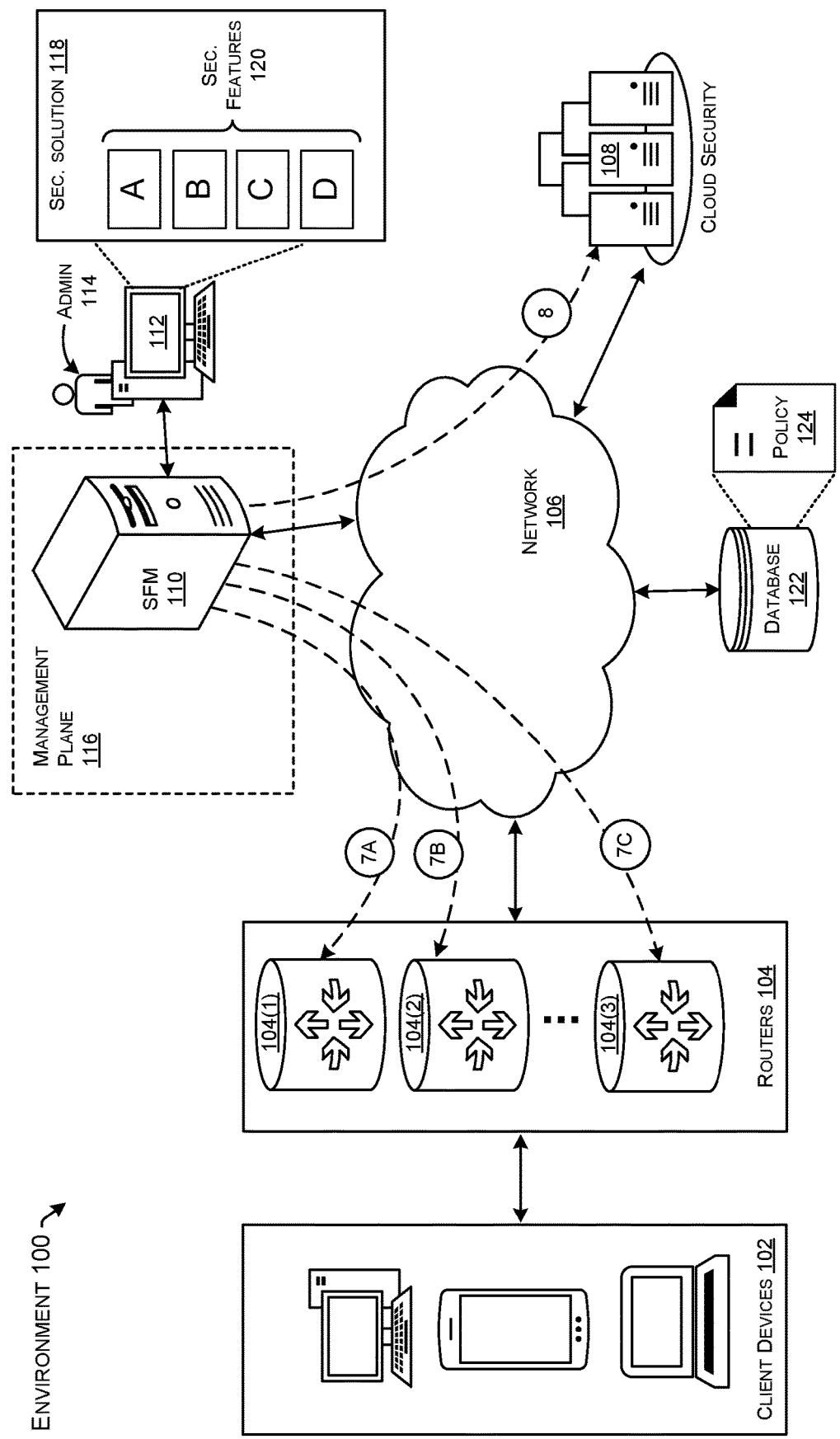
Figure 1E:
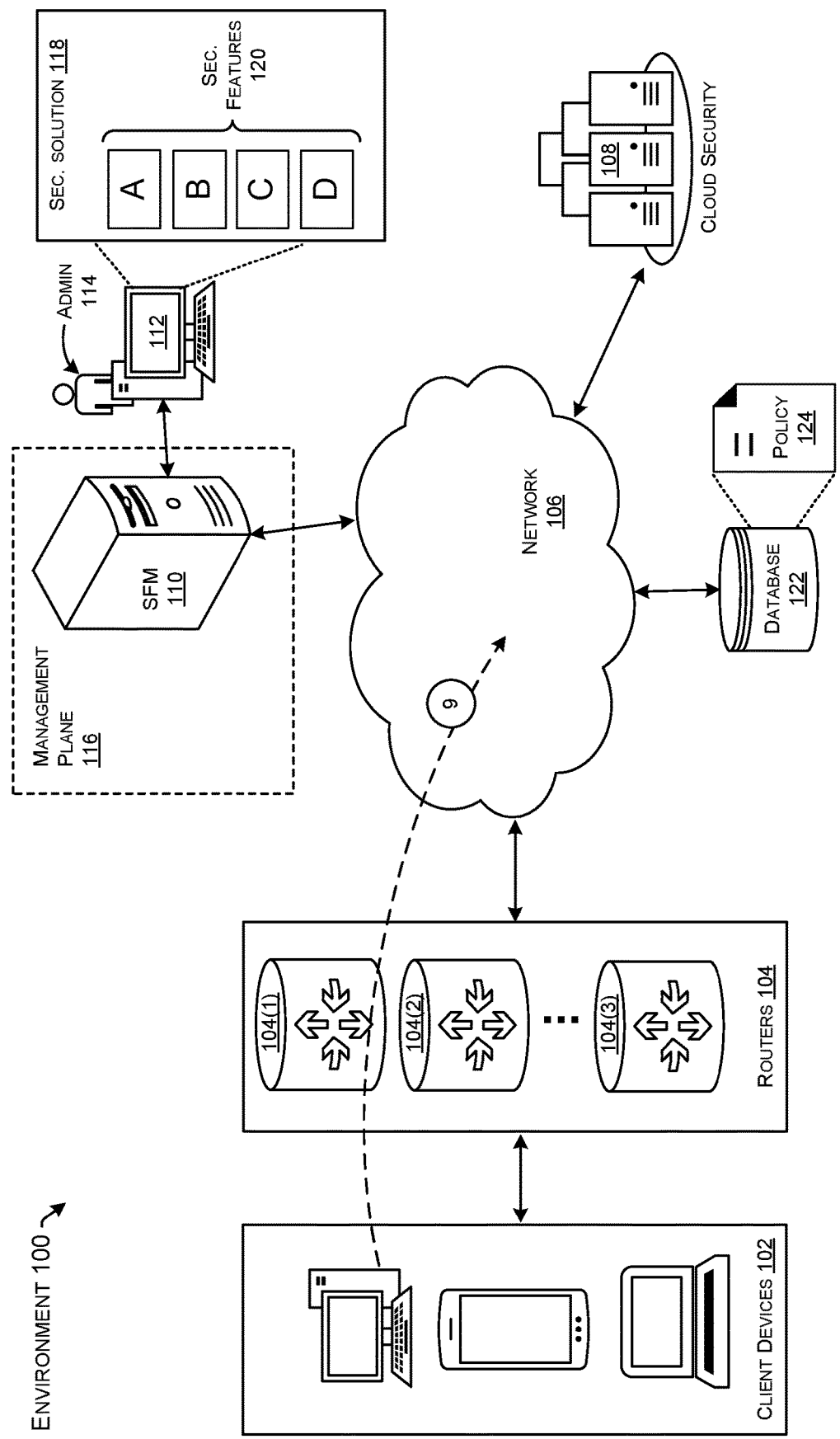

Referring to FIG. 1D, at Steps "7A," "7B." "7C," and/or "8," in some cases, security feature manager 110 may send instructions to devices of the network regarding implementation of security solution 118. For example, security feature manager 110 may send information regarding the distribution of the security features 120. Security feature manager 110 may send configuration instructions regarding the distribution of the security features 120, for instance. In one example, Step 7A may include security feature manager 110 sending configuration instructions to router 104(1) to run security features A and B. Additionally in this example, Step 8 may include security feature manager 110 sending configuration instructions to cloud security service 108 to run security features C and D for traffic passing through router 104(1). As such, in this example, security feature manager 110 has intelligently distributed (configured) security features 120 A and B on router 104(1) and security features 120 C and D on the cloud security provider, via the SDWAN management plane.

Finally, at "Step 9)," in some cases, an instance of data traffic may originate from a client device 102 and pass through router 104(1) on the way out to the broader network 106. In some examples, the data traffic may travel through the cloud, while in other examples the data traffic may travel directly from router 104(1) to a client device. In keeping with the example distribution of security features 120 described above, security features 120 A and B will be performed on the data traffic by router 104(1), while security features 120 C and D will be performed on the data traffic by cloud security service 108. Note that the cloud security service 108 is expected to be able to enforce the distributed security stack, as configured, based on tunnel identification (tunnel IDs) or another identification mechanism for any given router 104. Stated another way, although the portion of security solution 118 enforced by the cloud security service 108 may vary for data flows from different routers 104, the cloud security service 108 should be able to determine which security features 120 to run based on identifying the router 104. Thus, security solution orchestration concepts allow intelligent distribution of security solution 118, smartly matching the capabilities of devices in a network, while preventing duplication of security features 120 for any given data traffic. Furthermore, even though enforcement of individual security features 120 may be happening at different places (on box, or at the cloud security service, or both), with security solution orchestration based at least in part on router resource, data traffic from any given router 104 is able to have the same, consistent security stack applied.

To summarize, the security solution orchestration techniques described herein may help optimize resource utilization by distributing a security stack across devices of a network, thereby improving network performance. The techniques may provide a solution that accomplishes capability discovery for both on-premise devices and also cloud service(s). The techniques include a convenient presentation (e.g., a single pane) of the capabilities to a security administrator so that a security stack may be smartly distributed over the network. The orchestration may help avoid duplication of security features and/or inconsistent policy implementation. Thus, security solution orchestration techniques may provide an easier SASE migration path for customers.

Figure 2:
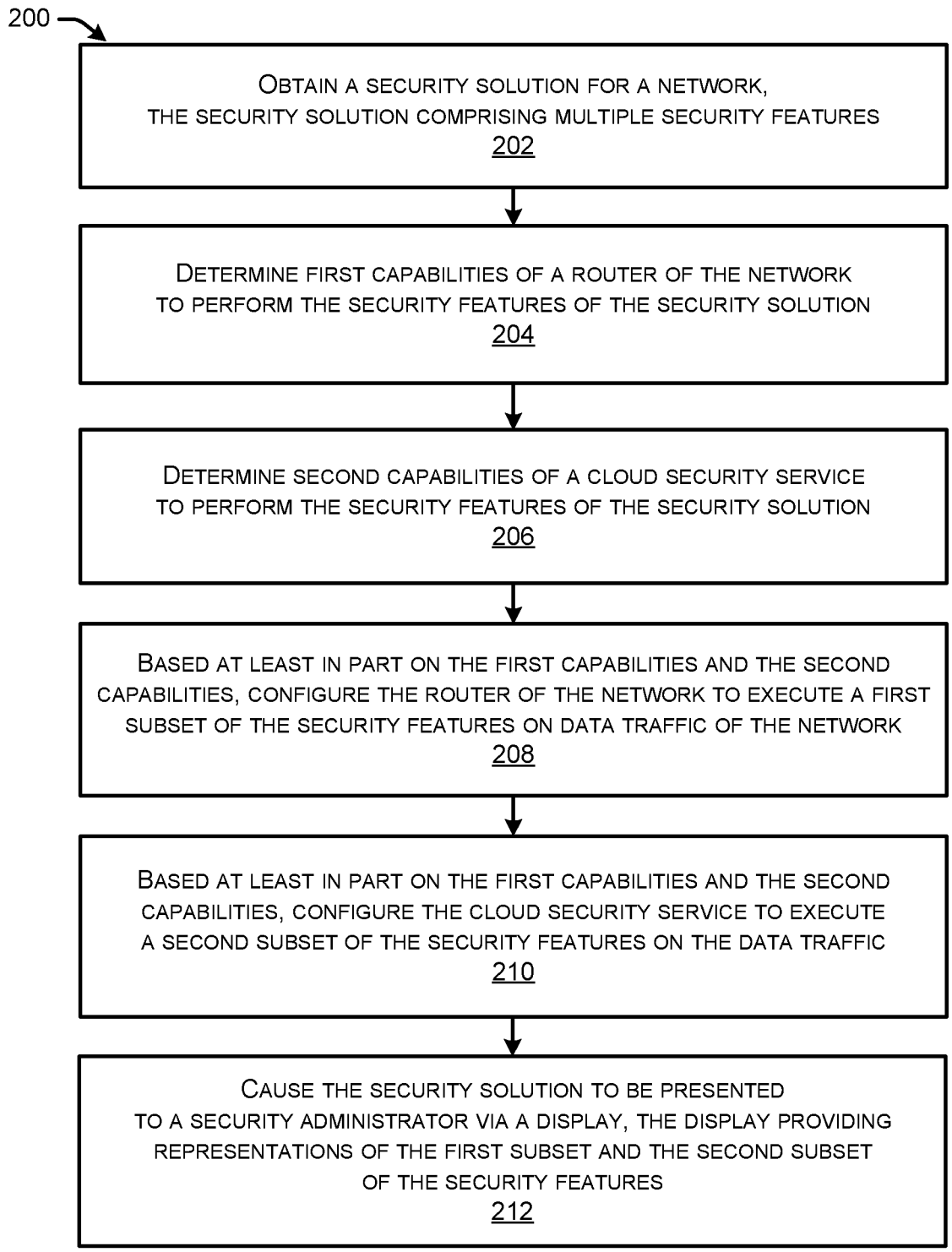
FIGS. 2 and 3 illustrate flow diagrams of example methods for the orchestration of a security solution as a part of communications among network devices, in accordance with the present concepts.
Figure 3:
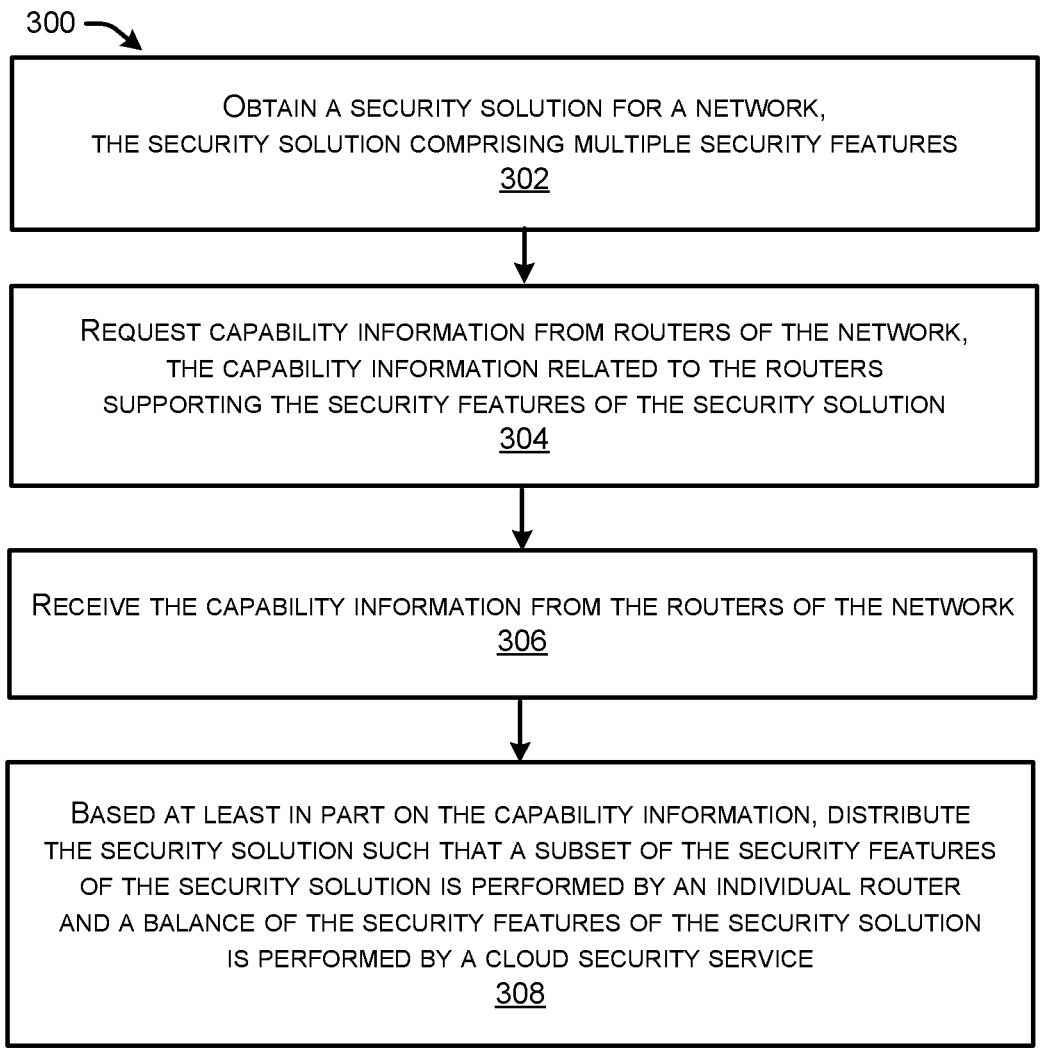

FIGS. 2 and 3 illustrate flow diagrams of example methods 200 and 300 that include functions that may be performed at least partly by a security feature manager, such as security feature manager 110 described relative to FIGS. 1A-1E. The logical operations described herein with respect to FIGS. 2 and 3 may be implemented (1) as a sequence of computer-implemented acts or program modules running on a computing system and/or (2) as interconnected machine logic circuits or circuit modules within the computing system. In some examples, the method(s) 200 and/or 300 may be performed by a system comprising one or more processors and one or more non-transitory computer-readable media storing computer-executable instructions that, when executed by the one or more processors, cause the one or more processors to perform the method(s) 200 and/or 300.

The implementation of the various devices and/or components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations might be performed than shown in the FIGS. 2 and 3 and described herein. These operations may also be performed in parallel, or in a different order than those described herein. Some or all of these operations may also be performed by components other than those specifically identified. Although the techniques described in this disclosure is with reference to specific devices, in other examples, the techniques may be implemented by less devices, more devices, different devices, or any configuration of devices and/or components.

FIG. 2 illustrates a flow diagram of an example method 200 for network devices to perform security solution orchestration techniques. Method 200 may be performed by a server device communicatively coupled to other network devices, such as one or more routers (e.g., routers 104), and/or a cloud security service (e.g., cloud security service 108), for instance.

At 202, method 200 may include obtaining a security solution for a network. In some examples, the security solution may comprise multiple security features. For instance, the security solution may represent a desired security stack that is to be applied to data traffic over the network. The security features of the stack may include any of a number of example security features, such as a firewall, DNS Security, DNS redirection, web filtering, threat inspection, file inspection, Unified Threat Defense, SSL Proxy, etc.

At 204, method 200 may include determining first capabilities of a router of the network. The capabilities may correspond to the router's own capability to perform any or all of the security features of the security solution. For instance, the capabilities may refer to whether any particular security feature is supported by the router. In some examples, the router may not have the computing resources to support a particular security feature. The method 200 may include determining the first capabilities of the router to perform the security features by sending a request to the router to discover the capabilities of the router, for example. The discovery of the first capabilities may be performed via API calls over an SDWAN management plane, for instance.

At 206, method 200 may include determining second capabilities of a cloud security service. The capabilities may correspond to the capability of the cloud security service to perform any or all of the security features of the security solution.

At 208, based at least in part on the first capabilities and the second capabilities, method 200 may include configuring the router of the network to execute a first subset of the security features on data traffic of the network. For example, the first subset of the security features may include a firewall implemented at/by the router. The configuring of the router may be performed via the SDWAN management plane.

At 210, based at least in part on the first capabilities and the second capabilities, method 200 may include configuring the cloud security service to execute a second subset of the security features on the data traffic. In some examples, the first subset and the second subset may combine to make a complete security solution. For instance, the individual security features that make up the first subset, when combined with the individual security features that make up the second subset, may constitute the overall security solution with no overlap in individual security features. Furthermore, any given router in the network may be configured to perform a different subset of the security features of the security solution, but for data traffic from each router, the cloud security service may be configured to perform the balance of the security features of the security solution. Stated another way, the same discrete list of security features may be performed on data traffic from any given router to which the security solution is meant to apply, while different subsets of the security features may be performed in different places, depending on the discovered capabilities of any given router. Therefore, the method 200 may also include determining third capabilities of another (second) router of the network to perform the security features of the security solution. In this instance, based at least in part on the first capabilities and the third capabilities, the method 200 may include configuring the second router of the network to execute a third subset of the security features on data traffic of the network. In at least some cases, the third subset of the security features may include at least one different individual security feature than the first subset.

At 212, method 200 may include causing the security solution to be presented to a security administrator via a display. In some examples, the display may provide representations of the first subset and the second subset of the security features. For instance, the display may be available to a security administrator to be able to view information regarding the security features, the overall security solution, the capabilities of any of the network devices, the capabilities of the cloud security service, the distribution of the security features among the network devices and/or the cloud security service, views of the security features individually or as sets or subsets of features, selectable views of any of the above elements, etc. The security solution may be presented via a display in a way that provides a holistic, or overall, view of the security solution in one convenient place, rather than the security administrator having to access information regarding routers and a cloud service in different management systems.

FIG. 3 illustrates a flow diagram of an example method 300 for network devices to perform security solution orchestration techniques. Method 300 may be performed by a server device communicatively coupled to other network devices, such as one or more routers (e.g., routers 104), and/or a cloud security service (e.g., cloud security service 108), for instance.

At 302, method 300 may include obtaining a security solution for a network. In some examples, the security solution may comprise multiple security features.

At 304, method 300 may include requesting capability information from routers of the network. For example, the capability information may be related to whether the routers support the security features of the security solution.

At 306, method 300 may include receiving the capability information from the routers of the network. In some examples, the requesting the and receiving the capability information may be performed via API calls over an SDWAN management plane. Method 300 may also include causing the capability information related to the routers supporting the security features to be displayed to a security administrator.

At 308, based at least in part on the capability information, method 300 may include distributing the security solution such that a subset of the security features of the security solution is performed by an individual router, while a balance of the security features of the security solution is performed by a cloud security service. In some examples, the subset of the security features of the security solution may comprise different individual security features for different individual routers of the network. Method 300 may include distributing the security solution such that a different subset of the security features of the security solution is performed by a different individual router. Additionally, the security solution applied to data traffic from the individual router and the different individual router may comprise the same overall list, or stack, of security features, without overlap of any security features.

Figure 4:
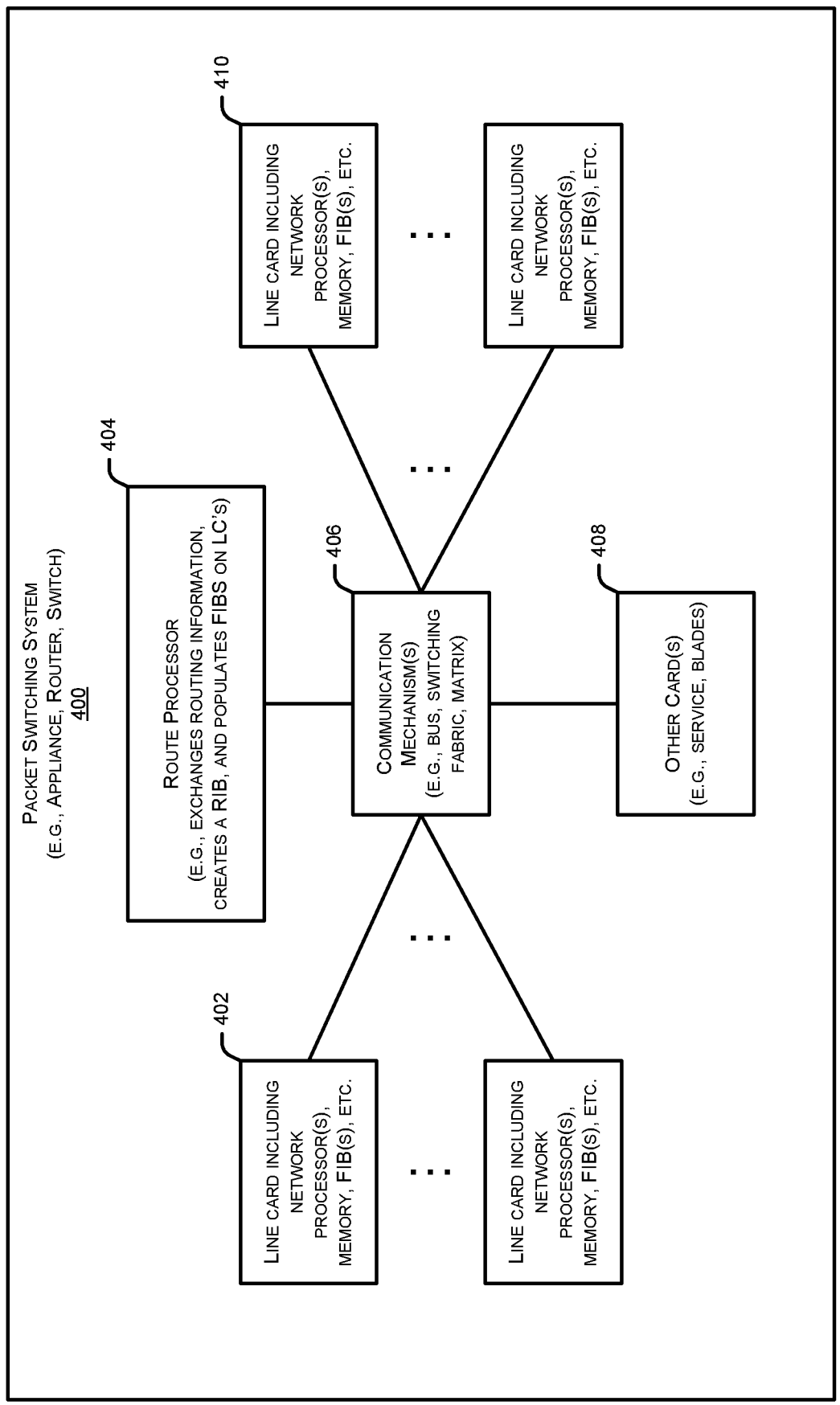
FIG. 4 illustrates a block diagram illustrating an example packet switching system that can be utilized to implement various aspects of the technologies disclosed herein.

FIG. 4 illustrates a block diagram illustrating an example packet switching device (or system) 400 that can be utilized to implement various aspects of the technologies disclosed herein. In some examples, packet switching device(s) 400 may be employed in various networks, such as, for example, network 106 as described with respect to FIGS. 1A-1E. For instance, packet switching device 400 may represent one of routers 104.

In some examples, a packet switching device 400 may comprise multiple line card(s) 402, 410, each with one or more network interfaces for sending and receiving packets over communications links (e.g., possibly part of a link aggregation group). The packet switching device 400 may also have a control plane with one or more processing elements 404 for managing the control plane and/or control plane processing of packets associated with forwarding of packets in a network. The packet switching device 400 may also include other cards 408 (e.g., service cards, blades) which include processing elements that are used to process (e.g., forward/send, drop, manipulate, change, modify, receive, create, duplicate, apply a service) packets associated with forwarding of packets in a network. The packet switching device 400 may comprise hardware-based communication mechanism 406 (e.g., bus, switching fabric, and/or matrix, etc.) for allowing its different entities 402, 404, 408 and 410 to communicate. Line card(s) 402, 410 may typically perform the actions of being both an ingress and/or an egress line card 402, 410, in regard to multiple other particular packets and/or packet streams being received by, or sent from, packet switching device 400.

Figure 5:
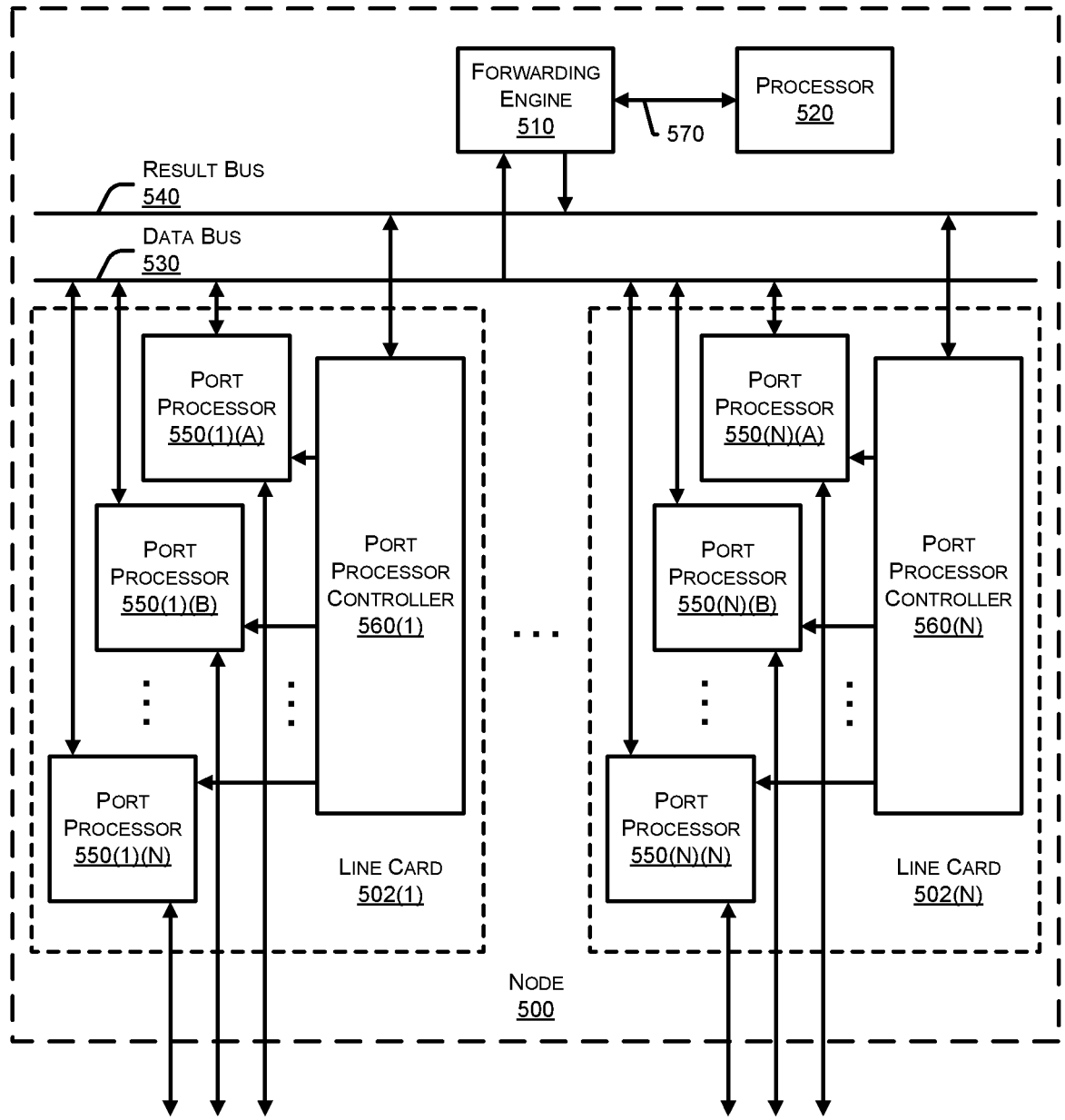
FIG. 5 illustrates a block diagram illustrating certain components of an example node that can be utilized to implement various aspects of the technologies disclosed herein.

FIG. 5 illustrates a block diagram illustrating certain components of an example node 500 that can be utilized to implement various aspects of the technologies disclosed herein. In some examples, node(s) 500 may be employed in various networks, such as, for example, network 106 as described with respect to FIGS. 1A-1E.

In some examples, node 500 may include any number of line cards 502 (e.g., line cards 502(1)-(N), where N may be any integer greater than 1) that are communicatively coupled to a forwarding engine 510 (also referred to as a packet forwarder) and/or a processor 520 via a data bus 530 and/or a result bus 540. Line cards 502(1)-(N) may include any number of port processors 550(1)(A)-(N)(N) which are controlled by port processor controllers 560(1)-(N), where N may be any integer greater than 1. Additionally, or alternatively, forwarding engine 510 and/or processor 520 are not only coupled to one another via the data bus 530 and the result bus 540, but may also communicatively coupled to one another by a communications link 570.

The processors (e.g., the port processor(s) 550 and/or the port processor controller(s) 560) of each line card 502 may be mounted on a single printed circuit board. When a packet or packet and header are received, the packet or packet and header may be identified and analyzed by node 500 (also referred to herein as a router) in the following manner. Upon receipt, a packet (or some or all of its control information) or packet and header may be sent from one of port processor(s) 550(1)(A)-(N)(N) at which the packet or packet and header was received and to one or more of those devices coupled to the data bus 530 (e.g., others of the port processor(s) 550(1)(A)-(N)(N), the forwarding engine 510 and/or the processor 520). Handling of the packet or packet and header may be determined, for example, by the forwarding engine 510. For example, the forwarding engine 510 may determine that the packet or packet and header should be forwarded to one or more of port processors 550(1)(A)-(N)(N). This may be accomplished by indicating to corresponding one(s) of port processor controllers 560(1)-(N) that the copy of the packet or packet and header held in the given one(s) of port processor(s) 550(1)(A)-(N)(N) should be forwarded to the appropriate one of port processor(s) 550(1)(A)-(N)(N). Additionally, or alternatively, once a packet or packet and header has been identified for processing, the forwarding engine 510, the processor 520, and/or the like may be used to process the packet or packet and header in some manner and/or may add packet security information in order to secure the packet. On a node 500 sourcing such a packet or packet and header, this processing may include, for example, encryption of some or all of the packet's or packet and header's information, the addition of a digital signature, and/or some other information and/or processing capable of securing the packet or packet and header. On a node 500 receiving such a processed packet or packet and header, the corresponding process may be performed to recover or validate the packet's or packet and header's information that has been secured.

Figure 6:
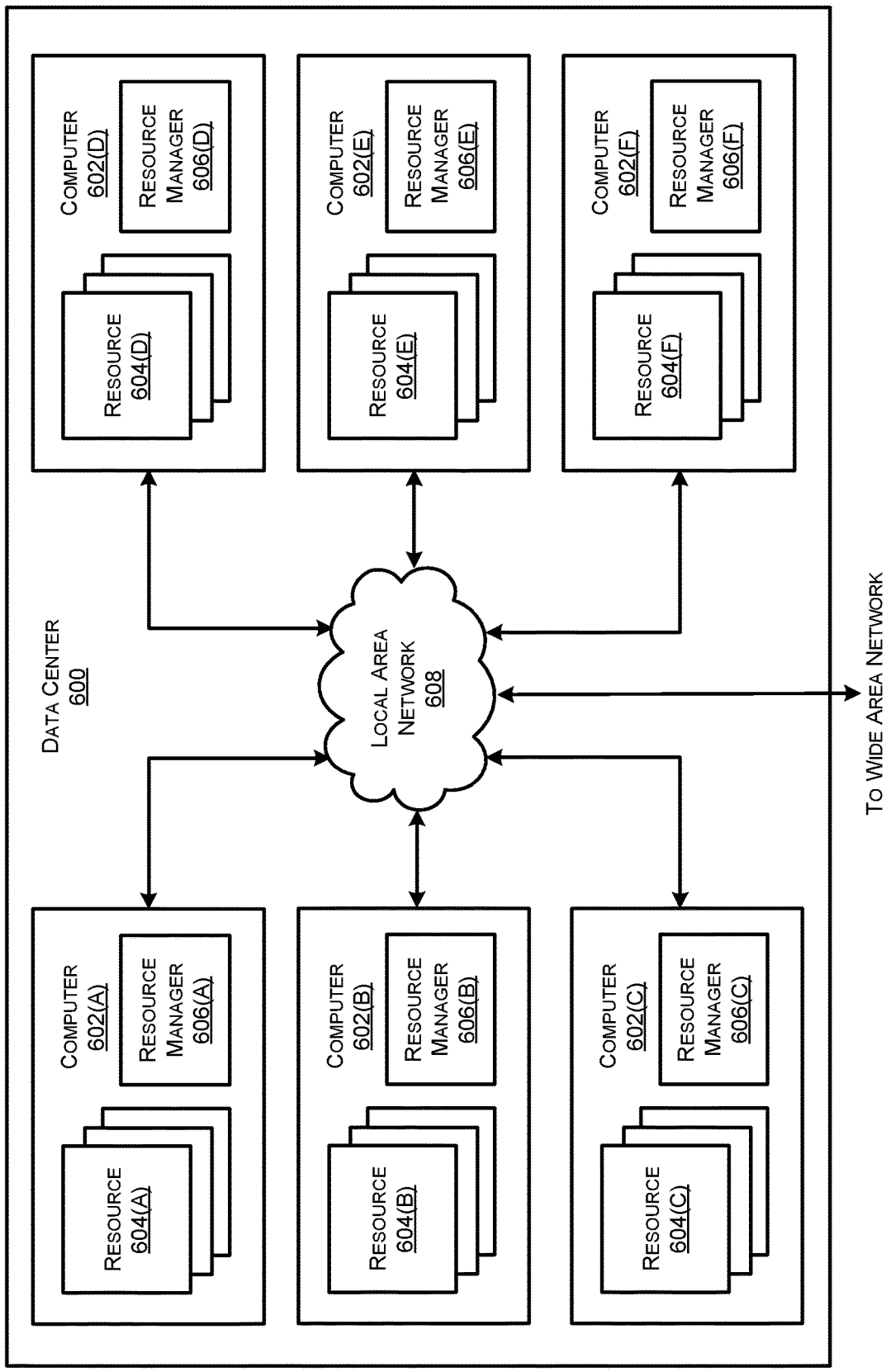
FIG. 6 illustrates a computing system diagram illustrating a configuration for a data center that can be utilized to implement aspects of the technologies disclosed herein.

FIG. 6 is a computing system diagram illustrating a configuration for a data center 600 that can be utilized to implement aspects of the technologies disclosed herein. The example data center 600 shown in FIG. 6 includes several computers 602A-602F (which might be referred to herein singularly as "a computer 602" or in the plural as "the computers 602") for providing computing resources. In some examples, the resources and/or computers 602 may include, or correspond to, any type of networked device described herein, such as a server device representing security feature manager 110. Although, computers 602 may comprise any type of networked device, such as servers, switches, routers, hubs, bridges, gateways, modems, repeaters, access points, hosts, etc.

The computers 602 can be standard tower, rack-mount, or blade server computers configured appropriately for providing computing resources. In some examples, the computers 602 may provide computing resources 604 including data processing resources such as virtual machine (VM) instances or hardware computing systems, database clusters, computing clusters, storage clusters, data storage resources, database resources, networking resources, and others. Some of the computers 602 can also be configured to execute a resource manager 606 capable of instantiating and/or managing the computing resources. In the case of VM instances, for example, the resource manager 606 can be a hypervisor or another type of program configured to enable the execution of multiple VM instances on a single computer 602. Computers 602 in the data center 600 can also be configured to provide network services and other types of services.

In the example data center 600 shown in FIG. 6, an appropriate local area network (LAN) 608 is also utilized to interconnect the computers 602A-602F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 600, between each of the computers 602A-602F in each data center 600, and, potentially, between computing resources in each of the computers 602. It should be appreciated that the configuration of the data center 600 described with reference to FIG. 6 is merely illustrative and that other implementations can be utilized.

In some examples, the computers 602 may each execute one or more application containers and/or virtual machines to perform techniques described herein. For instance, the containers and/or virtual machines may serve as server devices, user devices, and/or routers in the network 106.

In some instances, the data center 600 may provide computing resources, like application containers, VM instances, and storage, on a permanent or an as-needed basis. Among other types of functionality, the computing resources provided by a cloud computing network may be utilized to implement the various services and techniques described above. The computing resources 604 provided by the cloud computing network can include various types of computing resources, such as data processing resources like application containers and VM instances, data storage resources, networking resources, data communication resources, network services, and the like.

Each type of computing resource 604 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 604 not mentioned specifically herein.

The computing resources 604 provided by a cloud computing network may be enabled in one embodiment by one or more data centers 600 (which might be referred to herein singularly as "a data center 600" or in the plural as "the data centers 600"). The data centers 600 are facilities utilized to house and operate computer systems and associated components. The data centers 600 typically include redundant and backup power, communications, cooling, and security systems. The data centers 600 can also be located in geographically disparate locations. One illustrative embodiment for a data center 600 that can be utilized to implement the technologies disclosed herein will be described below with regards to FIG. 7.

Figure 7:
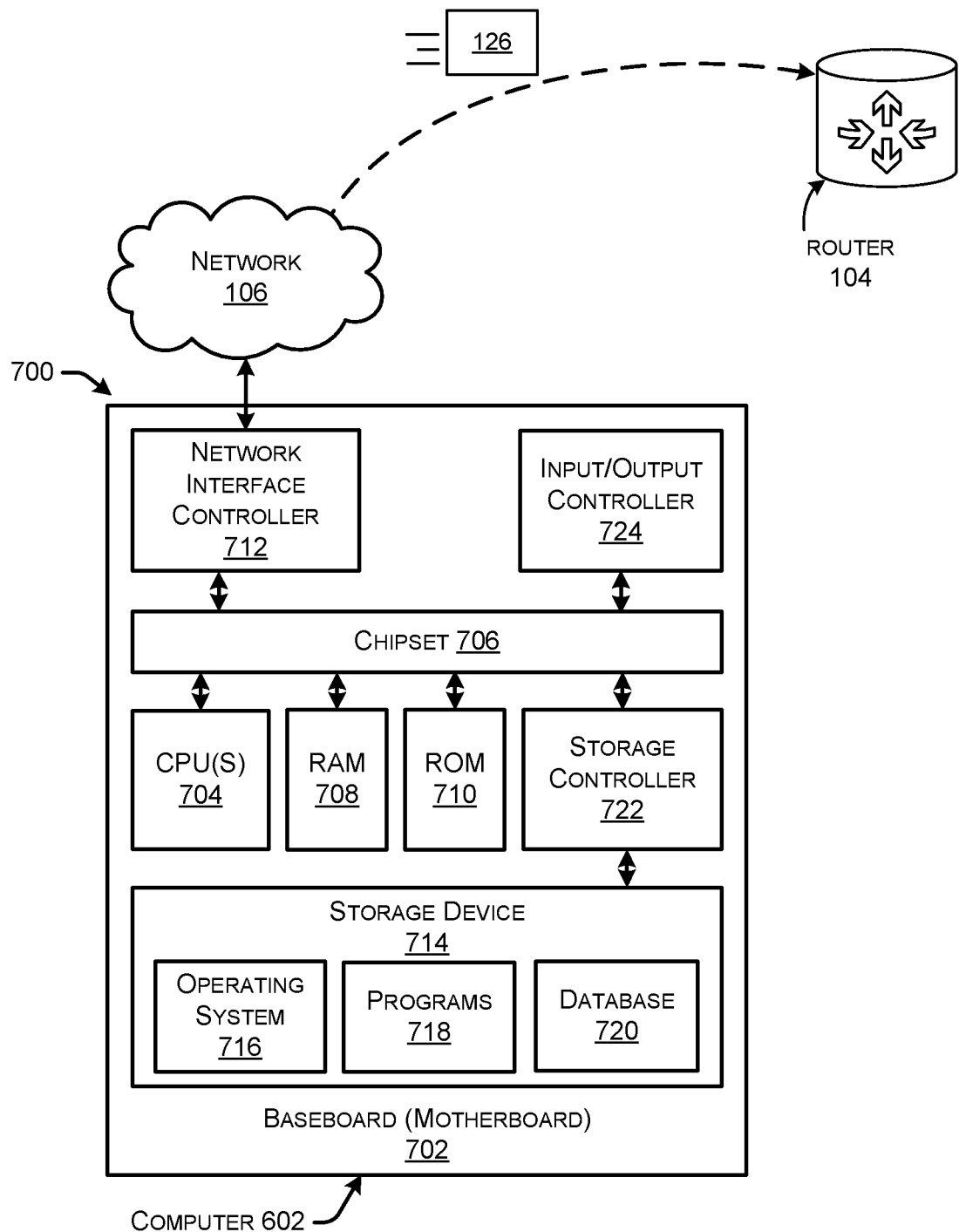
FIG. 7 is a computer architecture diagram showing an illustrative computer hardware architecture for implementing a computing device that can be utilized to implement aspects of the various technologies presented herein.

FIG. 7 shows an example computer architecture 700 for a computer 602 capable of executing program components for implementing the functionality described above. The computer architecture 700 shown in FIG. 7 illustrates a conventional server computer, workstation, desktop computer, laptop, tablet, network appliance, e-reader, smartphone, and/or other computing device, and can be utilized to execute any of the software components presented herein. The computer 602 may, in some examples, correspond to a physical device described herein (e.g., server device, router, etc.), and may comprise networked devices such as servers, switches, routers, hubs, bridges, gateways, modems, repeaters, access points, etc. For instance, computer 602 may correspond to a server device representing security feature manager 110.

As shown in FIG. 7, the computer 602 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 602.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 602. The chipset 706 can further provide an interface to a computer-readable storage medium such as a read-only memory ("ROM") 710 or non-volatile RAM ("NVRAM") for storing basic routines that help to startup the computer 602 and to transfer information between the various components and devices. The ROM 710 or NVRAM can also store other software components necessary for the operation of the computer 602 in accordance with the configurations described herein.

The computer 602 can operate in a networked environment using logical connections to remote computing devices and computer systems through a network, such as the networks 106 or 608. The chipset 706 can include functionality for providing network connectivity through a network interface controller (NIC) 712, such as a gigabit Ethernet adapter. The NIC 712 is capable of connecting the computer 602 to other computing devices over the network 106. For instance, in the example shown in FIG. 7, NIC 712 may help facilitate transfer of data, packets, and/or communications, such as requests 126, over the network 106 with a router 104. It should be appreciated that multiple NICs 712 can be present in the computer 602, connecting the computer to other types of networks and remote computer systems.

The computer 602 can be connected to a storage device 714 that provides non-volatile storage for the computer. The storage device 714 can store an operating system 716, programs 718, requests 126, information regarding capabilities of other devices, a security policy(ies) 124, information about security features 120, and/or other data. The storage device 714 can be connected to the computer 602 through a storage controller 722 connected to the chipset 706, for example. The storage device 714 can consist of one or more physical storage units. The storage controller 722 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 602 can store data on the storage device 714 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 714 is characterized as primary or secondary storage, and the like.

For example, the computer 602 can store information to the storage device 714 by issuing instructions through the storage controller 722 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 602 can further read information from the storage device 714 by detecting the physical states or characteristics of one or more particular locations within the physical storage units.

In addition to the mass storage device 714 described above, the computer 602 can have access to other computer-readable storage media to store and retrieve information, such as policies, program modules, data structures, and/or other data. It should be appreciated by those skilled in the art that computer-readable storage media is any available media that provides for the non-transitory storage of data and that can be accessed by the computer 602. In some examples, the operations performed by the network 106, and or any components included therein, may be supported by one or more devices similar to computer 602. Stated otherwise, some or all of the operations performed by the network 106, and or any components included therein, may be performed by one or more computer devices 602 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, ternary content addressable memory (TCAM), and/or other optical storage, magnetic cassettes, magnetic tape, magnetic disk storage or other magnetic storage devices, or any other medium that can be used to store the desired information in a non-transitory fashion.

As mentioned briefly above, the storage device 714 can store an operating system 716 utilized to control the operation of the computer 602. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 714 can store other system or application programs and data utilized by the computer 602.

In one embodiment, the storage device 714 or other computer-readable storage media is encoded with computer-executable instructions which, when loaded into the computer 602, transform the computer from a general-purpose computing system into a special-purpose computer capable of implementing the embodiments described herein. These computer-executable instructions transform the computer 602 by specifying how the CPUs 704 transition between states, as described above. According to one embodiment, the computer 602 has access to computer-readable storage media storing computer-executable instructions which, when executed by the computer 602, perform the various processes described above with regards to FIGS. 1A-3. The computer 602 can also include computer-readable storage media having instructions stored thereupon for performing any of the other computer-implemented operations described herein.

The computer 602 can also include one or more input/output controllers 724 for receiving and processing input from a number of input devices, such as a keyboard, a mouse, a touchpad, a touch screen, an electronic stylus, or other type of input device. Similarly, an input/output controller 724 can provide output to a display, such as a computer monitor, a flat-panel display, a digital projector, a printer, or other type of output device. It will be appreciated that the computer 602 might not include all of the components shown in FIG. 7, can include other components that are not explicitly shown in FIG. 7, or might utilize an architecture completely different than that shown in FIG. 7.

As described herein, the computer 602 may comprise one or more devices, such as a server device, any device described above as part of network 106, and/or other devices. The computer 602 may include one or more hardware processors 704(processors) configured to execute one or more stored instructions. The processor(s) 704 may comprise one or more cores. Further, the computer 602 may include one or more network interfaces configured to provide communications between the computer 602 and other devices, such as the communications described herein as being performed by a router 104, one or more devices representing a security feature manager 110, devices associated with a cloud security service 108, and/or other devices. In some examples, the communications may include data, packet, request, acknowledgment, security policy and/or other information transfer, for instance. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 718 may comprise any type of programs or processes to perform the techniques described in this disclosure in accordance with security solution orchestration techniques. For instance, the programs 718 may cause the computer 602 to perform techniques for communicating with other devices using any type of protocol or standard usable for determining connectivity. Additionally, the programs 718 may comprise instructions that cause the computer 602 to perform the specific techniques for the orchestration of a security solution.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A computer-implemented method comprising:
   obtaining a security solution for a network, the security solution comprising multiple security features;
   determining first capabilities of a router of the network to perform the security features of the security solution;
   determining second capabilities of a cloud security service to perform the security features of the security solution;
   based at least in part on the first capabilities and the second capabilities, configuring the router of the network to execute a first subset of the security features on data traffic of the network;
   based at least in part on the first capabilities and the second capabilities, configuring the cloud security service to execute a second subset of the security features on the data traffic; and
   causing the security solution to be presented to a security administrator via a display, the display providing representations of the first subset and the second subset of the security features.

2. The computer-implemented method of claim 1, wherein the first subset of the security features includes a firewall implemented at the router.

3. The computer-implemented method of claim 1, wherein the determining the first capabilities of the router of the network to perform the security features comprises sending a request to the router to discover the first capabilities of the router.

4. The computer-implemented method of claim 1, further comprising:
   determining the first subset and the second subset such that the first subset and the second subset complete the security solution.

5. The computer-implemented method of claim 1, wherein the first subset and the second subset comprise the security solution without overlap of individual security features of the multiple security features.

6. The computer-implemented method of claim 1, further comprising:
   determining third capabilities of another router of the network to perform the security features of the security solution; and
   based at least in part on the first capabilities and the third capabilities, configuring the another router of the network to execute a third subset of the security features on data traffic of the network.

7. The computer-implemented method of claim 6, wherein the third subset of the security features includes at least one different individual security feature than the first subset.

8. The computer-implemented method of claim 1, wherein the configuring the router and the configuring the cloud security service is performed via a software-defined wide area network (SDWAN) management plane.

9. A server device comprising:
   one or more processors; and
   one or more non-transitory computer-readable media storing computer-executable instructions that, when executed by the one or more processors, cause the one or more processors to:
   obtain a security solution for a network, the security solution comprising multiple security features;
   determine first capabilities of a router of the network to perform the security features of the security solution;
   determine second capabilities of a cloud security service provider to perform the security features of the security solution;
   based at least in part on the first capabilities and the second capabilities, configure the router of the network to execute a first subset of the security features on data traffic of the network;
   based at least in part on the first capabilities and the second capabilities, configure the cloud security service provider to execute a second subset of the security features on the data traffic; and
   cause the security solution to be presented to a security administrator via a display, the display including representations of the first subset and the second subset of the security features.

10. The server device of claim 9, wherein the first subset of the security features includes a firewall implemented at the router.

11. The server device of claim 9, wherein the determining the first capabilities of the router of the network to perform the security features comprises sending a request to the router to discover the first capabilities of the router.

12. The server device of claim 9, wherein the computer-executable instructions further cause the one or more processors to:
    determine the first subset and the second subset such that the first subset and the second subset complete the security solution.

13. The server device of claim 9, wherein the first subset and the second subset comprise the security solution without overlap of individual security features of the multiple security features.

14. The server device of claim 9, wherein the computer-executable instructions further cause the one or more processors to:
    determine third capabilities of another router of the network to perform the security features of the security solution; and
    based at least in part on the first capabilities and the third capabilities, configure the another router of the network to execute a third subset of the security features on data traffic of the network.

15. The server device of claim 14, wherein the third subset of the security features includes at least one different individual security feature than the first subset.

16. The server device of claim 9, wherein the configuring the router and the configuring the cloud security service is performed via a software-defined wide area network (SD-WAN) management plane.

17. A method comprising:
    obtaining a security solution for a network, the security solution comprising multiple security features;
    requesting capability information from routers of the network, the capability information related to the routers supporting the security features of the security solution;
    receiving the capability information from the routers of the network; and
    based at least in part on the capability information, distributing the security solution such that a subset of the security features of the security solution is performed by an individual router and a balance of the security features of the security solution is performed by a cloud security service.

18. The method of claim 17, wherein the subset of the security features of the security solution comprises different individual security features for different individual routers of the network.

19. The method of claim 17, further comprising:
    distributing the security solution such that:
        a different subset of the security features of the security solution is performed by a different individual router, and
        the security solution applied to data traffic from the individual router and the different individual router comprises the same security features without overlap of security features.

20. The method of claim 17, further comprising:
    causing capability information related to the routers supporting the security features to be displayed to a security administrator.

* * * * *